United States Patent

[11] 3,611,999

[72] Inventor John Sutcliffe Hey
    Horley, England
[21] Appl. No. 861,034
[22] Filed Sept. 25, 1969
[45] Patented Oct. 12, 1971
[73] Assignee Farm Automation Limited
    Horley, England
[32] Priority Sept. 25, 1968
[33] Great Britain
[31] 45498/68

[54] ANIMAL DRINKING DEVICES
    2 Claims, 5 Drawing Figs.
[52] U.S. Cl..................................................... 119/72.5,
                                                              119/75
[51] Int. Cl..................................................... A01k 07/00

[50] Field of Search............................................ 119/72.5,
                                                                    75

[56] References Cited
    UNITED STATES PATENTS
    3,179,085  4/1965  McKillip, Jr................... 119/75
    3,289,635  12/1966 Eagles........................... 119/72.5

Primary Examiner—Hugh R. Chamblee
Attorney—Irving M. Weiner

ABSTRACT: An animal drinking device comprising a valve arrangement operated by tilting a valve stem in a housing to release liquid. The housing is asymmetrically formed about a bore accommodating the stem to expose a part of the stem and allow the stem to be tilted by an animal biting the exposed part against an underlying wall of the housing.

PATENTED OCT 12 1971 3,611,999

INVENTOR
JOHN SUTCLIFFE HEY
BY *Irving M. Weiner*
ATTORNEYS

ANIMAL DRINKING DEVICES

The present invention relates to drinking apparatus for animals.

The invention consists in an animal drinking device comprising a body member formed with a valve seat, and a valve member formed with a valve head adapted to cooperate with the valve seat to control liquid flow through the device and a valve stem extending through a bore in the body member so that tilting of the stem relative to the bore moves the valve head to allow liquid to flow through the device wherein the body member is shaped asymmetrically relative to the bore to expose a part of the valve stem on one side of the stem axis and allow pressure to be applied between said part of the stem and a part of the body member on the opposite side of said axis to tilt the stem relative to the bore.

The stem may be hollow and the valve arrangement adapted to allow the drinking fluid to be supplied through said stem.

A device according to the invention is operated by an animal taking the cylindrical member into its mouth and deflecting the movable operating stem by a biting action between the exposed part of the stem and the opposite wall of the body member. It has been found that a biting action appears to be more acceptable to animals than other forms of valve operating action and this mode of operation ensures that the water is placed actually in the amimal's mouth.

Figure 1:
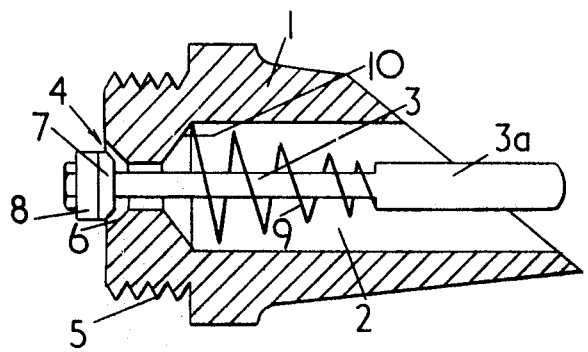
Figure 2:
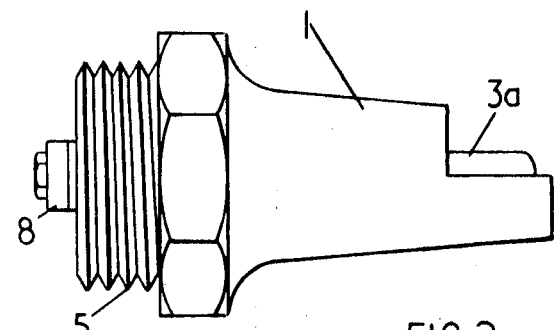
Figure 3:
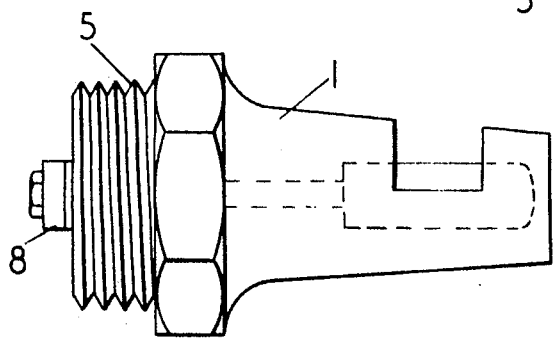
Figure 5:
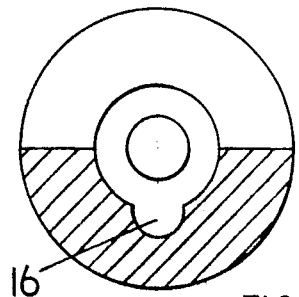
Figure 4:
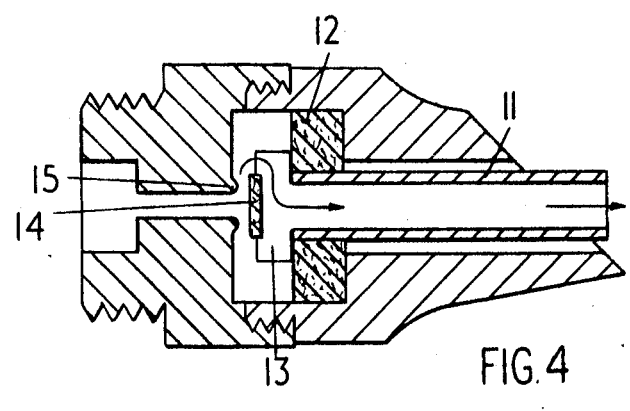

In the accompanying drawings:

FIG. 1 is a sectional view through one form of animal drinking device according to the invention, FIGS. 2 and 3 are side views of animal drinking devices similar to the device shown in FIG. 1 but having differently shaped body members, FIG. 4 is a sectional view through another form of drinking device according to the invention, and FIG. 5 is an end view partly in section of a device as shown in FIG. 1 with a modified body member bore construction applicable to any of the devices herein described.

In carrying the invention into effect according to one convenient mode by way of example a drinking device as shown in FIG. 1 comprises a tubular body member 1, in an internal longitudinal bore 2 of which is a movable member or valve stem 3 for operating a cantable valve member 4 controlling the flow of water through the device.

In use, the body member is attached at one end to a source of supply of water, by means of for example, an external thread 5 formed on said member so as to be angled slightly downwards from the horizontal.

The bore of the body member, at said one end, is reduced in cross section and is provided with a valve seat 6. The movable member includes a mating valve member, for the valve seat, in the form of a rubber seal 7 and washer cup 8 attached to an operating stem or rod 3a of the movable member.

The operating stem extends from the rubber seal through the valve aperture and down the bore of the body member. The valve so formed is normally maintained in a closed position by the action of a strong coil spring 9 bearing at one end against a ledge 10 in the bore of the body member formed by the portion with reduced cross section, and at its other end on an annular projection on the operating stem. Thus the spring exerts pressure on the operating stem, thereby pulling the rubber seal down onto the valve seat 6. Sideways deflection of the operating stem is sufficient to break the seal at the valve face and allow water to pass from the supply pipe down through the body member bore.

The outer surface of the body member is so shaped as to be convenient for an animal to grasp in its mouth.

Towards the open end of the body member a section of the member wall is cut away asymmetrically on a slant to expose the operating stem rod. Therefore an animal drinking by means of the device can operate the water supply valve by biting the exposed portion of the rod and remaining portion of the cylindrical member together. The operating stem can be suitably exposed, to facilitate the biting action and thus operation of the valve, in several alternative ways. For example, the open end of the cylindrical member can be cut away in a stepped manner as shown in FIG. 2 to expose an adequate length of the operating stem for the animal to bite. Alternatively, as shown in FIG. 3 a slot can be formed in the cylindrical member thereby exposing a portion of the stem at a distance from the open end of the cylindrical member.

In the embodiments shown in FIGS. 1 to 3 the spring and general form of the valve ensures turbulence of the supplied water, thereby preventing a jet of water being supplied which could be harmful to some animals, tending to choke them.

The valve can be alternatively maintained in the closed position by, for example, an elastic material or other suitable means.

The length of the operating stem is chosen to suit the conditions of use. It can be shorter than the body member so that it cannot easily be played with other than in the prescribed manner, or it can extend out of the end of said member, this sometimes being useful, say, for training an animal in the use of the device.

In an alternative embodiment shown in FIG. 4 the valve-operating stem is in the form of a tube 11 and the valve arrangement is such as to allow the water to be delivered to an animal through the tube. The valve head 13 rests on a resilient seat 12 through which the hollow valve stem passes, and arranged so that no water passes between the valve head and this seat, even when the stem is deflected. Attached to the top surface of the valve head a further resilient member 14 is adapted to normally abut against an annular projection 15 surrounding an inlet aperture for the supply of water, so as to block the supply of water. On deflection of the hollow stem this latter resilient member is deflected from the annular projection, and water can flow to the hollow valve stem via radial slots in the valve head connecting therewith. The hollow operating stem is exposed to facilitate the biting action as previously described and any of the asymmetrically body shapes shown in FIGS. 1 to 3 may be used.

As shown in FIG. 5, in any of the valve arrangements shown the body member bore can be formed with a longitudinal channel 16 and the stem may be surrounded by resilient packing so that on deflection of the stem liquid only flows through the channel.

I claim:

1. An animal-actuated drinking device comprising a unitary valve body having a bore therethrough providing an enlarged outlet at one end thereof and a small water inlet port at the other end thereof, a cantable valve member positioned near said other end of said valve body to control said inlet port, spring means within said enlarged outlet of said valve body engaging a valve stem connected with said valve member and a portion of the valve body to normally hold said valve member in position closing said inlet port, said valve stem removably affixed at one end to said valve member and extending through said bore of said valve body and terminating with an enlarged animal actuation member, and said valve body is provided with a tapered extension underlying said actuation member of said valve stem whereby said actuation member may be moved toward said extension to cant said valve member and open said inlet port.

2. An animal-actuated drinking device as defined by claim 1 wherein said outlet of said valve body has an internal channel provided therein extending along said tapered extension below said valve stem.